Feb. 27, 1973   A. M. BECRAFT ET AL   3,718,398
METHOD OF ALIGNING LASER BEAM BY ROTATION
Original Filed Sept. 26, 1969   5 Sheets-Sheet 1
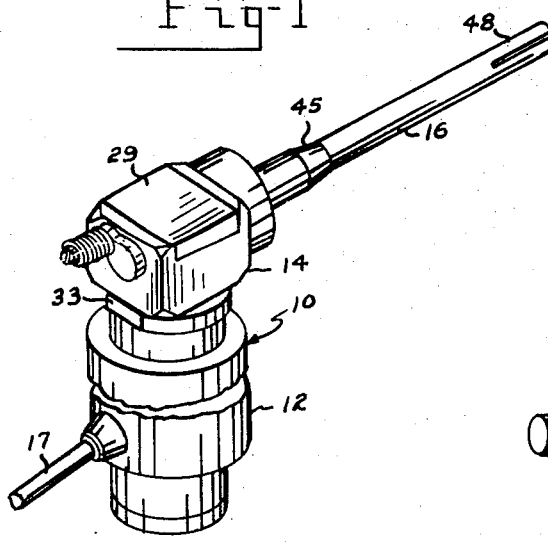
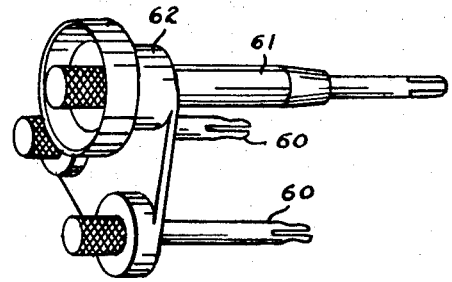
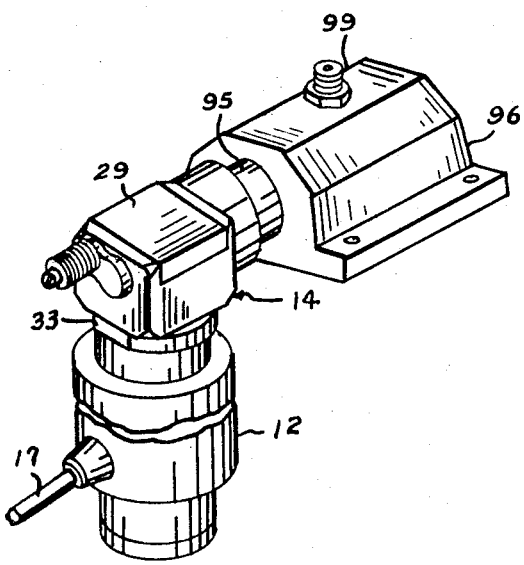
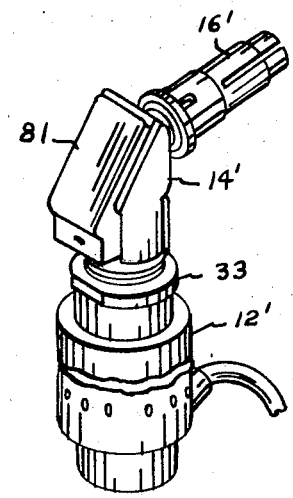
INVENTORS
ARDATH M. BECRAFT
CLIFFORD E. HAMMER
BY Harry A. Herbert Jr.
ATTORNEY
Richard J. Killoren
AGENT Feb. 27, 1973  A. M. BECRAFT ET AL  3,718,398
METHOD OF ALIGNING LASER BEAM BY ROTATION
Original Filed Sept. 26, 1969  5 Sheets-Sheet 2
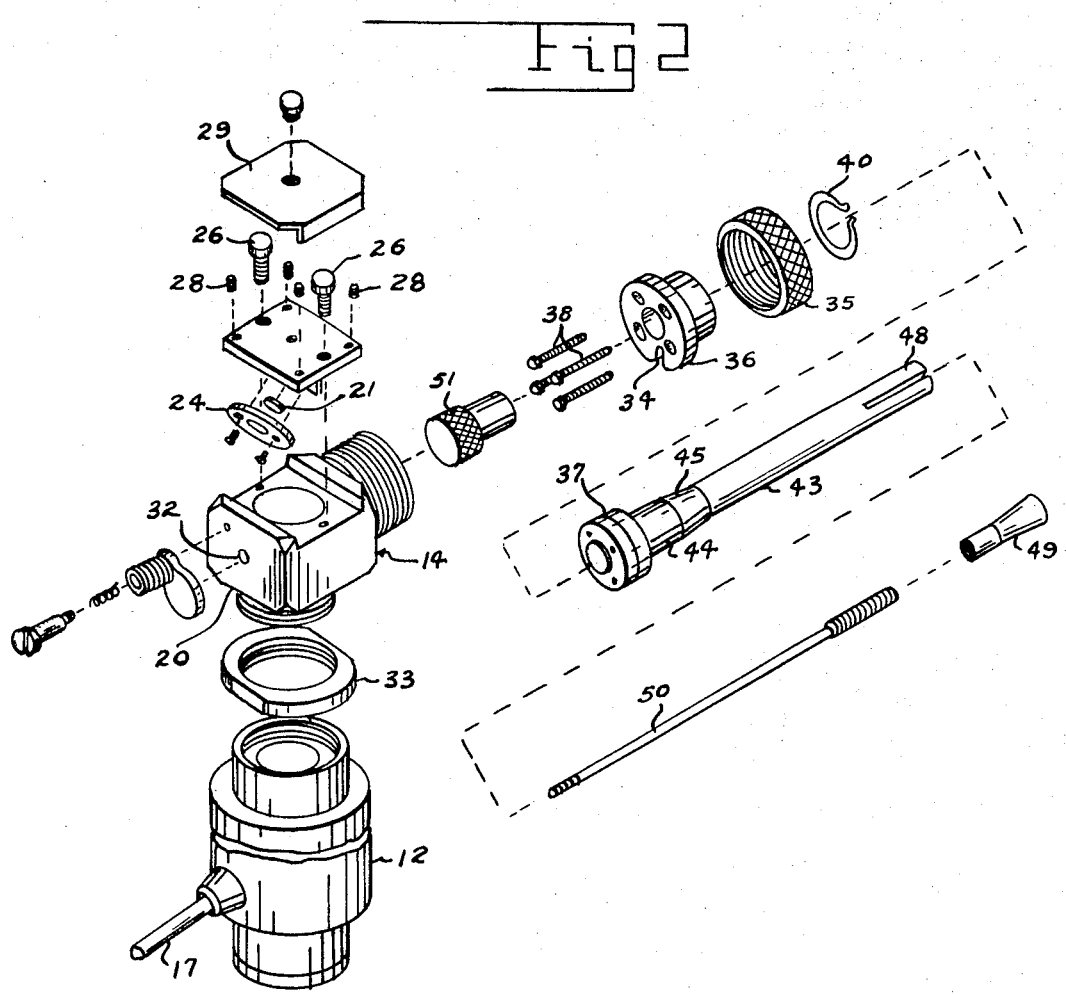
INVENTORS
ARDATH M. BECRAFT
CLIFFORD E. HAMMER
BY Harry A. Herbert Jr
ATTORNEY
Richard J. Killoren
AGENT Feb. 27, 1973 A. M. BECRAFT ET AL 3,718,398
METHOD OF ALIGNING LASER BEAM BY ROTATION
Original Filed Sept. 26, 1969 5 Sheets-Sheet 3
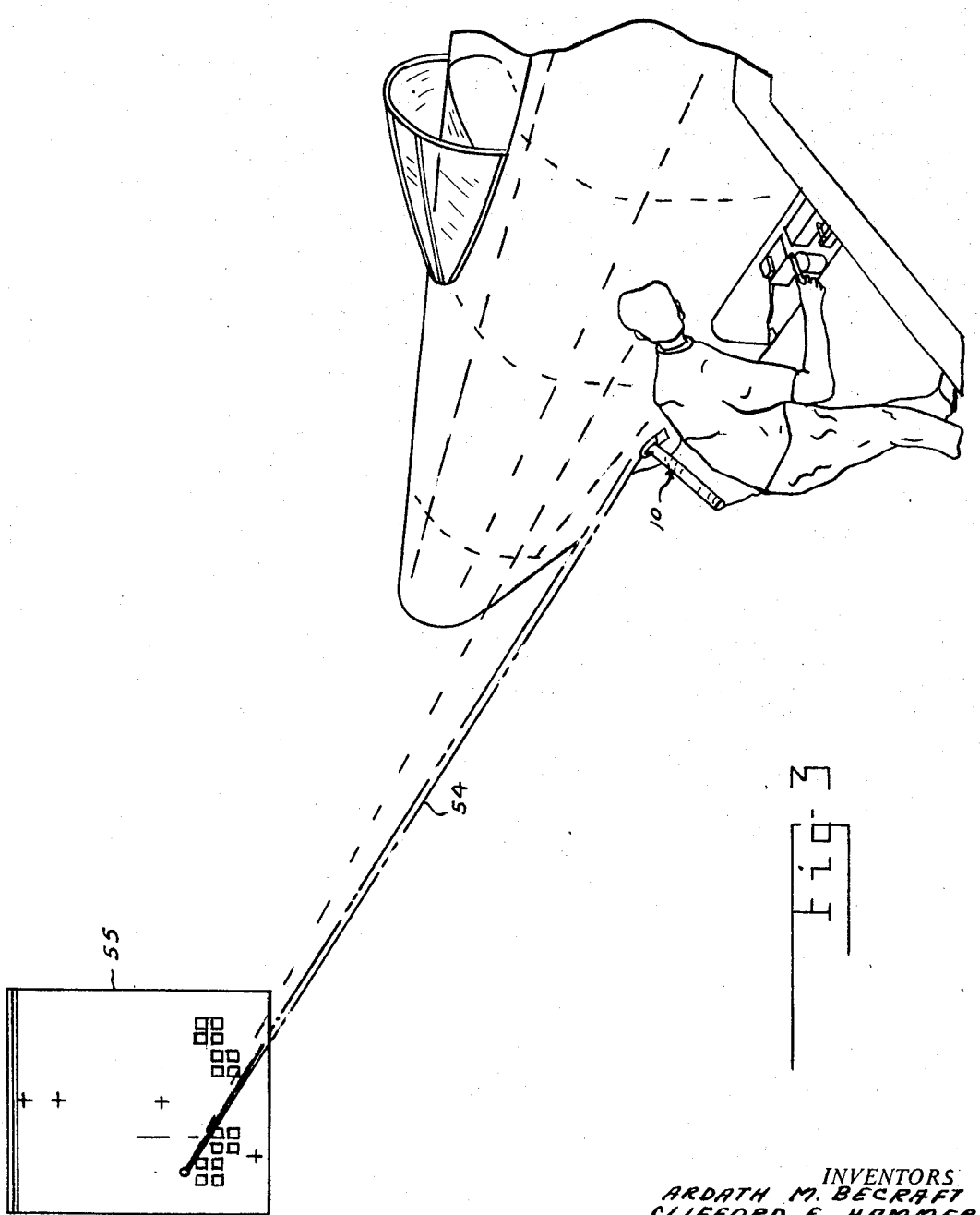
INVENTORS
ARDATH M. BECRAFT
CLIFFORD E. HAMMER
BY Harry A. Herbert Jr
ATTORNEY
Richard J. Killore
AGENT

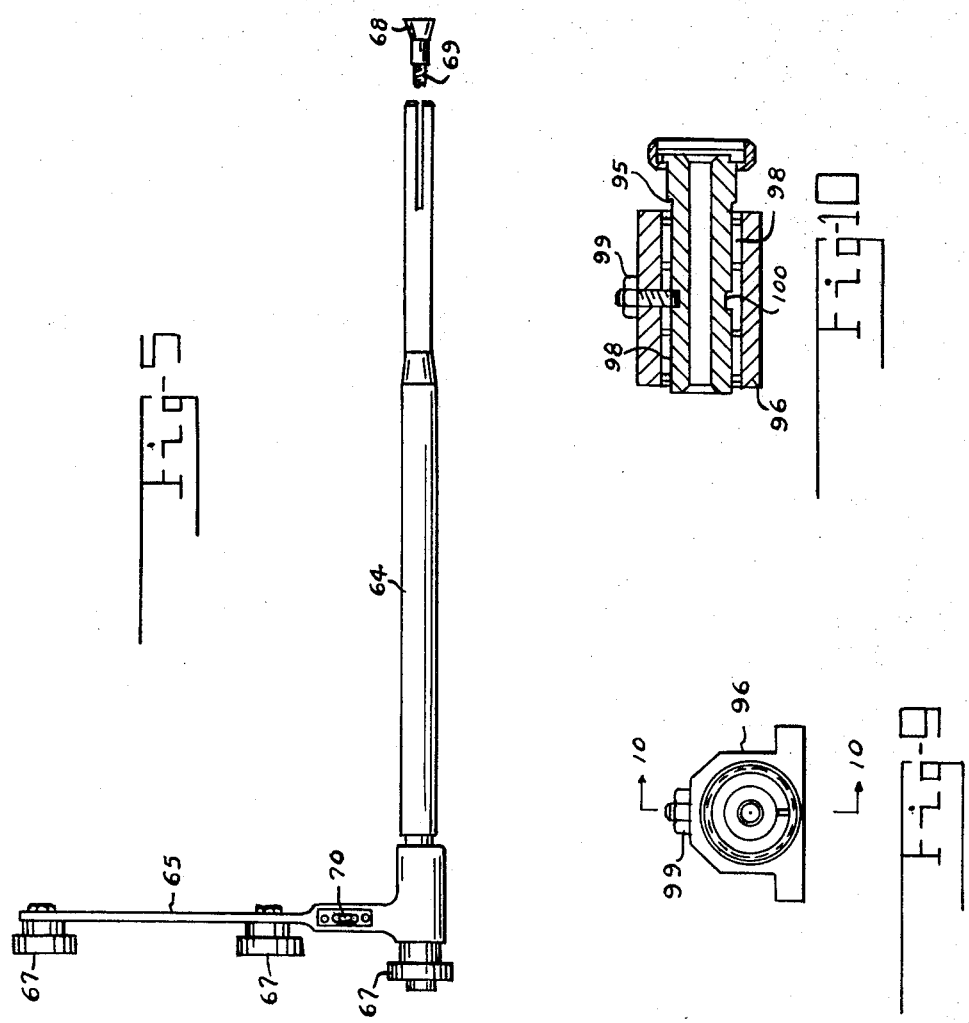

United States Patent Office 3,718,398
Patented Feb. 27, 1973

3,718,398
METHOD OF ALIGNING LASER BEAM BY ROTATION
Ardath M. Becraft, Dayton, and Clifford E. Hammer, Trotwood, Ohio, assignors to the United States of America as represented by the Secretary of the Air Force
Original application Sept. 26, 1969, Ser. No. 861,386.
Divided and this application Apr. 29, 1971, Ser. No. 138,422
Int. Cl. G01b 11/26
U.S. Cl. 356—153
1 Claim

ABSTRACT OF THE DISCLOSURE

A boresight alignment instrument having a helium-neon gas laser mounted on an alignment mandrel which fits into the gun barrel. A 45° mirror directs the laser beam along a line concentric with the axis of the bore of the barrel. The mandrel has an expanding collet to insure positive locking of the mandrel in the barrel. The laser beam is aligned with the desired output axis, of the adapter assembly, by securing the adapter assembly and laser to an alignment fixture which permits rotation of the laser and adapter assembly. The mirror position is adjusted to stop all motion of the light spot when the assembly is rotated 360°. The device is used with a highly reflective target to make the device useful under all lighting conditions.

BACKGROUND OF THE INVENTION

CROSS-REFERENCE TO RELATED APPLICATIONS

This is a division of application Ser. No. 861,386, filed Sept. 26, 1969, now Pat. No. 3,612,949.

In prior art methods for boresighting guns on aircraft, optical sights are used. With these systems two men are required, one man to view the target through the optical sight head and a second man to make corrections on the weapon mounts. With these devices the accuracy is marginal because of parallax in the optical system, and poor mechanical fit of the weapon adapters. These systems also present illumination problems for the target and a communication problem between the two men making the alignment which is made more difficult by the fact that they are working with an inverted image.

SUMMARY OF THE INVENTION

According to this invention a helium-neon gas laser is mounted on a mandrel which is designed to accurately position the laser beam with respect to the bore of the gun barrel. The laser provides a visible spot on the target placed 1,000 inches from the weapon which eliminates the problems of the inverted image and parallex present with the use of optical sight heads. A special alignment block is provided wherein the laser beam may be accurately aligned with the mandrel which in use is held concentric with the bore of the barrel by means of a positive lock. An expanding collet at the end of the mandrel is used to lock the mandrel in the gun barrel.

In the drawings:

FIG. 1 is an isometric view of a laser boresight device according to one embodiment of the invention;

FIG. 2 is an expanded view of the device of FIG. 1;

FIG. 3 shows the device of FIG. 1 mounted in the muzzle end of an aircraft gun to be boresighted;

FIG. 4 is a top plan view of another mandrel which may be used with the device of FIG. 1;

FIG. 5 is a partially cutaway view of a mandrel with offset for use with the device of FIG. 1;

FIG. 6 is an isometric view of a laser boresight device for use in the breech end of a gun;

FIG. 8 is an isometric view of a laser assembly and adapter block for the device of FIG. 1 mounted on an alignment block;

FIG. 9 is an end view of the alignment block of FIG. 8; and

FIG. 10 is a sectional view of the device of FIG. 9 along the line 10—10.

DETAILED DESCRIPTION OF THE INVENTION

Figure 7:
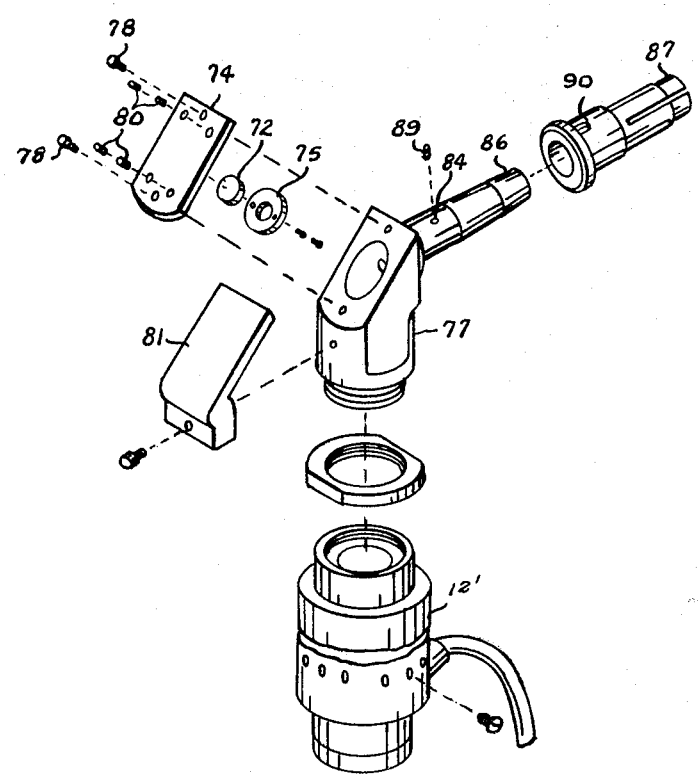
FIG. 7 is an expanded view of the device of FIG. 6.

Reference is now made to FIGS. 1 and 2 of the drawings which show a laser boresight device 10 having a laser 12, an adapter assembly 14 and a mandrel 16. The laser 12 may be any laser which provides visible light and for safety should have an output of less than 5 milliwatts. One laser that can be used is the Perkin-Elmer Model 5200 helium-neon gas laser which provides a red light. A laser power supply not shown is connected to lead 17.

The adapter assembly 14, as shown in FIG. 2, has a body member 20. A mirror 21 is secured to an adjustable mirror mount 23 by means of a mirror bracket 24. The mirror mount is held in place by screws 26 and is adjusted by four set screws 28. A cover member 29 covers the mirror mount 23. The mirror 21 directs the laser beam at substantially a right angle with respect to the laser axis so that the beam passing through aperture 32 can be aligned with the bore of a gun as will be described later.

The laser 12 is threadably secured to the adapter assembly 14 and is locked in place by means of locking nut 33.

A mandrel lock nut 35 surrounds the aligning laser adapter 36 which is secured to the muzzle mandrel 37 by means of screws 38. The lock nut 35 is kept from slipping off the mandrel 37 by a retaining ring 40. The mandrel 37 has a smaller diameter at 43 than at 44 with these portions being connected by a tapered portion 45. A collet 48 located at the end of mandrel 37 can be expanded by a tapered collet expander 49 which is secured to a draw bar 50 which has a knob 51 threaded on the end thereof.

In the operation of the device, after the boresight alignment instrument has been aligned as will be described later, the mandrel 16 is inserted in the barrel of the gun until the muzzle end of the gun rests tightly against the tapered portion 45. The draw bar 50 is then operated by rotating knob 51 to draw the expander 49 into the collet 48 to secure the mandrel in the gun barrel. The mandrel is then secured to the adapter assembly 14 by means of mandrel lock nut 35. The adapter assembly has a positioning pin, not shown, for engaging positioning slot 34 in the laser aligning adapter 36. After the laser beam is energized a laser beam 54, as shown in FIG. 3, is directed toward the target 55, placed 1,000 inches from the gun. The alignment of the gun can then be made in the usual manner by the man making the adjustment as the laser beam position on the target is viewed.

The particular mandrel used with the boresighting device is determined by the particular gun that is to be boresighted. When it is used with a six barrel mini-gun, additional support for the laser is needed. In the device of FIG. 4 two additional mandrels 60 are provided in addition to the main mandrel 61, all mounted on a support member 62. Each mandrel has a collet and expander as described with respect to FIG. 1 and 2.

When the gear on the aircraft makes it impossible to use direct line sighting, an offset mandrel as shown in FIG. 5 is needed. In this device the barrel mandrel 64 is the same as in FIG. 1. An arm 65 is positioned at right angle to the mandrel 64 with three attachment elements 67 provided on the arm 65. The particular attachment element used would be determined by conditions. A level 70 is also provided on the arm 65. A collect expander 68 and draw bar 69 are provided as in the device of FIG. 1 and 2. Other mandrels for specific uses may be provided as needed.

The device thus far described has been for use at the muzzle end of the gun. When the device is used at the breech end of the gun a special adapter assembly and mandrel must be provided to permit the passage of light through the mandrel. Such a device is shown in FIGS. 6 and 7. This device also has a laser 12', as in FIGS. 1 and 2, and adapter assembly 14' and a mandrel 16'. In this device a mirror 72 is secured to the mirror mount 74 by means of mirror bracket 75. The mirror mount is held in place on body member 77 by means of screws 78 and is adjusted by four set screws 80. A protective cover 81 covers the mirror mount 74. The laser 12 is attached to the adapter assembly 14' as in the device of FIGS. 1 and 2. A breech tool body member 84 is secured to the body member 77. Member 84 may be made integral with body member 77 or may be threadably secured thereto. Member 84 has a cylindrical passage therethrough, not shown, and has a tapered end portion 86 to expand the collet 87. The collet 87 surrounds member 84 and is retained thereon by a set screw 89 which moves in elongated slot 90.

In use the collet 87 is inserted in the breech end of the barrel of the gun. The housing 77 is then pushed forward to cause the taper 86 to spread the collet to lock the device in the gun barrel. The laser is then attached and the device is operated in the same manner as the device of FIGS. 1 and 2, except that the laser beam now passes through the passage in member 84 and through the gun barrel.

To align the laser beam with the desired output axis of the adapter assembly which indirectly aligns it with the axis of the mandrel, the adapter assembly 14 of FIGS. 1 and 2 is secured to a shaft 95 in an alignment block 96. The shaft 95 is mounted in bearings 98 and secured by a set screw 99 which engages a circumferential slot 100 in the shaft 95. The set screw 99 is adjusted to retain the shaft 95 within block 96 and permit rotation of the shaft. The laser is then energized and the laser and adapter assembly are rotated through 360°. With cover 29 removed the set screws 28 are adjusted until there is no movement of the beam spot during a 360° rotation. Since the mandrel 43 fits the adapter assembly in the same position and in the same manner as the shaft 95, the laser beam is now aligned in the desired manner with the axis of the mandrel. Due to misalignment caused by the weight of the laser and adapter assembly, an appropriate correction is machind into the mandrel assembly to correct for this misalignment. The alignment block used for the breech boresight device, not shown, is modified slightly from the one described above.

While the device has been described as used with a laser with visible light, a laser with light in the invisible spectrum could be used with a photosensitive target which provides a visible output on a display.

Also, though the target has been described as a 1,000 inches, other distances are used in certain applications.

This is thus provided a boresight alignment instrument which is more accurate than prior art devices and which requires only one man to make the gun adjustments.

We claim:

1. The method of aligning a laser beam with the longitudinal axis of a mandrel on which the laser is to be mounted, comprising: mounting the mandrel mounting attachment of the laser and adapter assembly, having an adjustable mirror mount within the adapter assembly, on an alignment block with a rotating shaft therein with the axis of said shaft being aligned with the axis of the adapter assembly corresponding to the longitudinal axis of the mandrel on which it is to be mounted; energizing the laser; rotating the laser and adapter assembly through 360 degrees; adjusting the mirror mount position to eliminate all motion of the laser beam as the assembly is rotated; removing the laser and adapter assembly from the alignment block; securing the mandrel to the adapter assembly mandrel mounting attachment, where the alignment block shaft had been mounted.

References Cited
UNITED STATES PATENTS 2,557,029    6/1951    Griffin _____ 350—80
2,696,052    12/1954    Czarnikow _____ 33—46 AT RONALD L. WIBERT, Primary Examiner P. K. GODWIN, Assistant Examiner U.S. Cl. X.R.

356—154, 225; 350—11; 33—228